United States Patent
Imanami et al.

(10) Patent No.: US 10,618,101 B2
(45) Date of Patent: Apr. 14, 2020

(54) MECHANICAL STRUCTURAL COMPONENT AND METHOD FOR MANUFACTURING SAME

(71) Applicant: JFE STEEL CORPORATION, Tokyo (JP)

(72) Inventors: Yuta Imanami, Tokyo (JP); Takashi Iwamoto, Tokyo (JP); Kiyoshi Uwai, Tokyo (JP)

(73) Assignee: JFE Steel Corporation, Tokyo (JP)

( * ) Notice: Subject to any disclaimer, the term of this patent is extended or adjusted under 35 U.S.C. 154(b) by 963 days.

(21) Appl. No.: 14/914,424

(22) PCT Filed: Jul. 10, 2014

(86) PCT No.: PCT/JP2014/003680
§ 371 (c)(1),
(2) Date: Feb. 25, 2016

(87) PCT Pub. No.: WO2015/029308
PCT Pub. Date: Mar. 5, 2015

(65) Prior Publication Data
US 2016/0207094 A1    Jul. 21, 2016

(30) Foreign Application Priority Data

Aug. 30, 2013 (JP) ................................ 2013-180260

(51) Int. Cl.
| | | |
|---|---|---|
| *B21K 1/30* | (2006.01) | |
| *C21D 9/32* | (2006.01) | |
| *C23C 8/22* | (2006.01) | |
| *C21D 1/06* | (2006.01) | |
| *C22C 38/32* | (2006.01) | |
| *C22C 38/60* | (2006.01) | |
| *C23C 8/02* | (2006.01) | |
| *C21D 1/26* | (2006.01) | |
| *C21D 6/00* | (2006.01) | |
| *C21D 8/00* | (2006.01) | |
| *C22C 38/00* | (2006.01) | |
| *C22C 38/02* | (2006.01) | |
| *C22C 38/04* | (2006.01) | |
| *C22C 38/06* | (2006.01) | |
| *C22C 38/26* | (2006.01) | |
| *C22C 38/28* | (2006.01) | |
| *F16H 55/06* | (2006.01) | |
| *F16H 55/17* | (2006.01) | |

(52) U.S. Cl.
CPC .................. *B21K 1/30* (2013.01); *C21D 1/06* (2013.01); *C21D 1/26* (2013.01); *C21D 6/002* (2013.01); *C21D 6/005* (2013.01); *C21D 6/008* (2013.01); *C21D 8/005* (2013.01); *C21D 9/32* (2013.01); *C22C 38/001* (2013.01); *C22C 38/002* (2013.01); *C22C 38/008* (2013.01); *C22C 38/02* (2013.01); *C22C 38/04* (2013.01); *C22C 38/06* (2013.01); *C22C 38/26* (2013.01); *C22C 38/28* (2013.01); *C22C 38/32* (2013.01); *C22C 38/60* (2013.01); *C23C 8/02* (2013.01); *C23C 8/22* (2013.01); *F16H 55/06* (2013.01); *F16H 55/17* (2013.01)

(58) Field of Classification Search
CPC ....................................................... B21K 1/30
See application file for complete search history.

(56) References Cited

U.S. PATENT DOCUMENTS

| | | |
|---|---|---|
| 2012/0006451 A1 | 1/2012 | Abe et al. |
| 2014/0014234 A1 | 1/2014 | Okamoto et al. |

FOREIGN PATENT DOCUMENTS

| | | |
|---|---|---|
| CN | 102149839 | 8/2011 |
| JP | 0441650 | 2/1992 |
| JP | 09241821 | 9/1997 |
| JP | 1171654 | 3/1999 |
| JP | 200296139 | 4/2002 |
| JP | 2006102821 | 4/2006 |
| JP | 2007284739 | 11/2007 |
| JP | 2012140675 | 7/2012 |
| JP | 2012237052 | 12/2012 |
| WO | 2012132786 | 10/2012 |

OTHER PUBLICATIONS

Mahcine translation of JP H11-71654 (Japanese language document published Mar. 16, 1999.*
Korean Office Action with partial English language translation for Application No. 10-2016-7004493, dated Feb. 9, 2017, 5 pages.
International Search Report for International Application No. PCT/JP2014/003680 dated Sep. 9, 2014.
Written Opinion of the International Search Authority for International Application No. PCT/JP2014/003680 dated Sep. 9, 2014.
Chinese Office Action with partial English language translation for Application No. 201480044934.3, dated Nov. 4, 2016, 6 pages.

(Continued)

*Primary Examiner* — Christopher S Kessler
(74) *Attorney, Agent, or Firm* — RatnerPrestia

(57) ABSTRACT

A mechanical structural component is a toothed component obtained by performing cold forging and carburizing treatment on a steel having a predetermined chemical composition, in prior austenite grains after the carburizing treatment, an area ratio of crystal grains of 50 μm or less is 80% or more, and an area ratio of crystal grains exceeding 300 μm is 10% or less, and a total helix deviation of teeth after the carburizing treatment satisfies Formula (1)

$$(B_{max}/L) \times 10^{-3} \leq 5 \qquad (1)$$

where $B_{max}$ is a maximum total helix deviation in all teeth in mm, and L is a face width in mm.

1 Claim, 1 Drawing Sheet

(56) References Cited

OTHER PUBLICATIONS

English language Supplementary European Search Report for Application No. 14840690.3, dated Nov. 18, 2016, 14 pages.
"KISSsoft Mar. 2012—Tutorial 8 Verifying a 1, 2 cylindrical gear pair", Mar. 27, 2012, retrieved from internet http://www.kisssoft.ch/english/downloads/pdf/03-12/kisssoft-tut-008-E-cylindrical-gearpair.pdf, 19 pages.
A. Milburn, "Tooth Tips, Gear Accuracy Charts—Part II", Gear Solutions, Jan. 1, 2005, retrieved from internet http://www.gearsolutions.com/media/uploads/assets/PDF/Articles/2005-01-01_Tooth_Tips/_Gear_Accuracy_Charts_Pt._2.pdf, col. 1-col. 2; figures 1, 2, 1 page.
Dr. Dennis M. Engelmann, "Manufacturing Net-Shaped, Cold-Formed Gears", Gear Technology, May 13, 2008, pp. 52-57, American Gear Manufacturers Association, retrieved from internet http://www.geartechnology.com/issues/0508x/engelmann.pdf, 6 pages.

\* cited by examiner

CARBURIZING AND QUENCHING    TEMPERING

ANNEALING

MECHANICAL STRUCTURAL COMPONENT AND METHOD FOR MANUFACTURING SAME

CROSS REFERENCE TO RELATED APPLICATIONS

This is the U.S. National Phase application of PCT/JP2014/003680, filed Jul. 10, 2014, which claims priority to Japanese Patent Application No. 2013-180260, filed Aug. 30, 2013, the disclosures of each of these applications being incorporated herein by reference in their entireties for all purposes.

TECHNICAL FIELD

The disclosure relates to a toothed mechanical structural component (case hardening steel member) such as a gear or a spline used in the fields of building industry machines and automobiles, and a method for manufacturing the same.

BACKGROUND

Members that are subject to repeated stress, such as power transmission components of automobiles (for example, toothed components such as gears or splines used in final gears of transmissions, drive shafts, etc.), are required to have not only excellent power transmission efficiency but also features such as high fatigue strength and low noise. It is therefore regarded as important to improve dimensional accuracy in the part of contact between members.

Members required to have high dimensional accuracy have conventionally been formed by machine cutting, but this has the disadvantage of longer processing time and higher manufacturing cost. Hence, cold forging that achieves excellent dimensional accuracy of the formed product has been increasingly used in recent years. Moreover, a component formed by hot forging and a component formed by cold forging differ in characteristics of the finished component. The cold-forged component, in which fiber flow is formed, tends to have excellent component characteristics.

For example, Patent Literature (PTL) 1 proposes a method for manufacturing a tooth profile component by stretch-forming an initial tooth profile by cold forging and then forming a tooth tip to project from the initial tooth profile by cold forging.

PTL 2 proposes a manufacturing method whereby a material inserted in a die is sandwiched between a punch and a knockout with a predetermined pressing force and, in the sandwiched state, the raw material is formed into a component by applying an axial pressing force that is larger than the sum of a knockout pressing force and a forming pressing force to the punch while rotating the punch, thus enhancing forming accuracy even in the case where the component has a large twist angle.

CITATION LIST

Patent Literatures

PTL 1: JP 2006-102821 A
PTL 2: JP 2002-96139 A

SUMMARY

Technical Problem

However, with the method of forming the tooth profile and then forming the tooth tip described in PTL 1, considerable working strain is introduced in the vicinity of the tooth surface in the tooth profile forming stage, causing the steel to strain-harden and decrease in plastic deformability. As a result, sufficient metal flow is not generated in the following tooth tip forming stage. Thus, the component may not be able to be accurately formed to predetermined dimensions.

With the manufacturing method described in PTL 2, finish machining is needed after cold forging, which inevitably increases the manufacturing cost.

It could therefore be helpful to provide a toothed mechanical structural component such as a gear or a spline having excellent dimensional accuracy and fatigue strength, by combining an optimum cold forging material and cold forging.

It could also be helpful to provide an advantageous method for manufacturing the aforementioned toothed mechanical structural component.

Solution to Problem

We made intensive research on cold forging materials and cold forging methods.

As a result, we discovered that, by combining and controlling a suitable cold forging material composition and an appropriate cold forging method, the dimensional accuracy of a toothed component manufactured by cold forging can be significantly improved as compared with conventional techniques. We also discovered that noise which has conventionally been a concern can be significantly reduced by improving the dimensional accuracy of the teeth, and fatigue strength can be advantageously improved by suppressing coarsening of austenite grains (that is, prior austenite grains) after carburizing treatment.

The disclosure is based on the aforementioned discoveries.

We thus provide the following.

1. A mechanical structural component that is a toothed component obtained by performing cold forging and carburizing treatment on a steel having a chemical composition that includes, in % by mass:
   0.10% to 0.35% C;
   0.01% to 0.13% Si;
   0.30% to 0.80% Mn;
   0.03% or less P;
   0.03% or less S;
   0.01% to 0.045% Al;
   0.5% to 3.0% Cr;
   0.0005% to 0.0040% B;
   0.003% to 0.080% Nb; and
   0.0080% or less N,
   wherein Ti mixed in the chemical composition as an impurity is limited to 0.005% or less, and the chemical composition has a balance including Fe and incidental impurities,
   in prior austenite grains after the carburizing treatment, an area ratio of crystal grains of 50 µm or less is 80% or more, and an area ratio of crystal grains exceeding 300 µm is 10% or less, and
   a total helix deviation of teeth after the carburizing treatment satisfies Formula (1)

$$(B_{max}/L) \times 10^3 \leq 5 \quad (1)$$

where $B_{max}$ is a maximum total helix deviation in all teeth in mm, and L is a face width in mm.

2. The mechanical structural component according to the foregoing 1, wherein the steel further includes, in % by mass, one or two types selected from the group consisting of:
0.0003% to 0.50% Sb; and
0.0003% to 0.50% Sn.

3. A method for manufacturing a mechanical structural component by forming, by annealing and cold forging, the steel having the chemical composition according to the foregoing 1 or 2 into a toothed component and then performing carburizing treatment on the toothed component,
wherein a reduction in area during tooth forming is in a range of Formula (2)

$$19\% \leq \{(A - \pi \times (d/2)^2)/A\} \times 100 \leq 70\% \quad (2)$$

where A is a sectional area before the tooth forming in mm$^2$, and d is a pitch diameter of the toothed component in mm.

4. The method for manufacturing a mechanical structural component according to the foregoing 3,
wherein the number of times the annealing is performed before the tooth forming is 2 or less.

Advantageous Effect

A toothed mechanical structural component having excellent dimensional accuracy can be obtained by combining an optimum cold forging material and cold forging method. Such a mechanical structural component has lower noise and higher fatigue strength.

BRIEF DESCRIPTION OF THE DRAWINGS

In the accompanying drawings.

DETAILED DESCRIPTION

Figure 1:
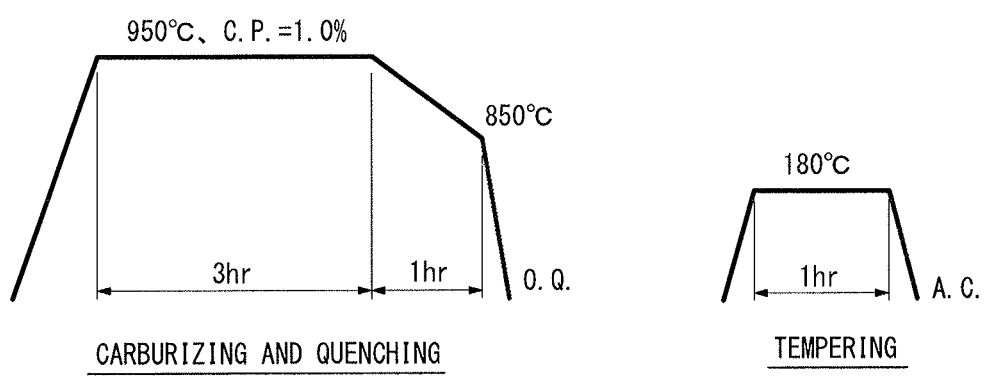
FIG. 1 is a diagram illustrating carburizing heat treatment conditions.

Detailed description is given below.
The reasons for limiting the chemical composition of the steel to the aforementioned range are explained first. The % indications for the ingredients are "% by mass", unless otherwise stated.
C: 0.10% to 0.35%
0.10% or more C is necessary to achieve, by quenching after carburizing treatment performed on the cold-forged product, sufficient hardness in the center portion of the forged product. When the C content exceeds 0.35%, however, the toughness of the center portion degrades. The C content is accordingly limited to the range of 0.10% to 0.35%. The C content is preferably 0.25% or less and more preferably 0.20% or less, in terms of toughness.
Si: 0.01% to 0.13%
Si is useful as a deoxidizer, and at least 0.01% Si needs to be added. Si, however, preferentially oxidizes in the carburized surface layer, and not only accelerates grain boundary oxidation, but also solid-solution-strengthens ferrite and increases deformation resistance to thereby degrade cold forgeability. The upper limit of the Si content is therefore 0.13%. The Si content is preferably in the range of 0.02% to 0.10%, and more preferably in the range of 0.02% to 0.09%.
Mn: 0.30% to 0.80%
Mn is an element effective in improving quench hardenability, and at least 0.30% Mn needs to be added. Excess addition of Mn, however, causes an increase in deformation resistance by solid solution strengthening. The upper limit of the Mn content is therefore 0.80%. The Mn content is preferably 0.60% or less, and more preferably 0.55% or less.
P: 0.03% or less
P segregates to crystal grain boundaries and decreases toughness. Accordingly, a lower P content is more desirable, though up to 0.03% P is allowable. The P content is preferably 0.025% or less. Although the lower limit of the P content is not particularly limited, an unnecessarily lower P content leads to longer refining time and higher refining cost, and so the P content may be 0.010% or more. The P content is preferably 0.013% or more.
S: 0.03% or less
S exists as a sulfide inclusion, and is an element effective in improving machinability by cutting. Excess addition of S, however, causes a decrease in cold forgeability. The upper limit of the S content is therefore 0.03%. Although the lower limit of the S content is not particularly limited, the S content may be 0.010% or more to ensure machinability by cutting. The S content is preferably 0.012% or more.
Al: 0.01% to 0.045%
Excess Al fixes N in the steel as AlN, and causes the quenching effect of B to develop. To stabilize the component strength after carburizing treatment, it is important to suppress the development of the quenching effect of B. The upper limit of the Al content is therefore 0.045%. Since Al is also an element effective in deoxidation, the lower limit of the Al content is 0.01%. The Al content is preferably in the range of 0.01% to 0.040%, and more preferably in the range of 0.015% to 0.035%.
Cr: 0.5% to 3.0%
Cr is an element that contributes to not only improved quench hardenability but also improved resistance to temper softening, and also is useful in accelerating carbide spheroidizing. When the Cr content is less than 0.5%, the effect of the addition is poor. When the Cr content exceeds 3.0%, it facilitates excess carburizing and retained austenite generation, and adversely affects fatigue strength. The Cr content is accordingly limited to the range of 0.5% to 3.0%. The Cr content is preferably in the range of 0.7% to 2.5%, more preferably in the range of 1.0% to 1.8%, and further preferably in the range of 1.4% to 1.8%.
B: 0.0005% to 0.0040%
B has an effect of reducing solute N by combining with N in the steel. Thus, B reduces dynamic strain aging during cold forging caused by solute N, and contributes to lower deformation resistance during forging. To achieve this effect, 0.0005% or more B needs to be added. On the other hand, when the B content exceeds 0.0040%, the deformation resistance reduction effect saturates, and toughness declines. The B content is accordingly limited to the range of 0.0005% to 0.0040%. The B content is preferably in the range of 0.0005% to 0.0030%, and more preferably in the range of 0.0005% to 0.0020%.
Nb: 0.003% to 0.080%
Nb has an effect of forming NbC in the steel and suppressing, by a pinning effect, coarsening of prior austenite grains during carburizing treatment. To achieve this effect, at least 0.003% Nb needs to be added. On the other hand, when the Nb content exceeds 0.080%, the precipitation of coarse NbC may cause a decrease in coarsening suppressibility and a decrease in fatigue strength. The Nb content is accordingly limited to the range of 0.003% to 0.080%. The Nb content is preferably in the range of 0.010% to 0.060%, and more preferably in the range of 0.015% to 0.045%.
N: 0.0080% or less N forms a solute in the steel, and undergoes dynamic strain aging during cold forging and as a result causes an increase in deformation resistance. N is thus an ingredient the mixing of which in the steel is preferably avoided as much as possible. The N content is therefore 0.0080% or less. The N content is preferably 0.0070% or less, and more preferably 0.0065% or less.

Ti: 0.005% or less

Ti is an ingredient the mixing of which in the steel is preferably avoided as much as possible. In detail, Ti tends to form coarse TiN by combining with N, and also adding Ti simultaneously with Nb facilitates the formation of a coarse precipitate and causes a decrease in fatigue strength. Hence, the mixing of Ti is preferably reduced as much as possible. 0.005% or less Ti is, however, allowable. The Ti content is preferably 0.003% or less, and may be even 0%.

While the basic ingredients have been described above, the following elements may also be included as appropriate when necessary according to the disclosure.

Sb: 0.0003% to 0.50%

Sb is an element effective in suppressing decarburization of the surface of the steel material and preventing a decrease in surface hardness. Excess addition of Sb, however, degrades cold forgeability. The Sb content is therefore in the range of 0.0003% to 0.50%. The Sb content is preferably in the range of 0.0010% to 0.050%, and more preferably in the range of 0.0015% to 0.035%.

Sn: 0.0003% to 0.50%

Sn is an element effective in improving the anti-corrosion property of the surface of the steel material. Excess addition of Sn, however, degrades cold forgeability. The Sn content is therefore in the range of 0.0003% to 0.50%. The Sn content is preferably in the range of 0.0010% to 0.050%, and more preferably in the range of 0.0015% to 0.035%.

The toothed component obtained according to the disclosure is surface-hardened by carburizing heat treatment. To achieve high fatigue strength, it is important that the grain size after the carburizing treatment is fine.

In detail, in prior austenite grains after the carburizing treatment, the area ratio of the crystal grains of 50 μm or less needs to be 80% or more, and the area ratio of the crystal grains exceeding 300 μm needs to be 10% or less. Preferably, the area ratio of the crystal grains of 50 μm or less is 90% or more, and the area ratio of the crystal grains exceeding 300 μm is 5% or less.

While the chemical composition and structure according to the disclosure have been described above, it is important that the total helix deviation of the teeth after the carburizing treatment in the disclosed component satisfies Formula (1):

$$(B_{max}/L) \times 10^3 \leq 5 \quad (1)$$

where $B_{max}$ is the maximum total helix deviation in all teeth (mm), and L is the face width (mm).

The left side of Formula (1) indicates the degree of accuracy error of the teeth in one component. When this value exceeds 5, large noise is inevitable. The value of the left side of Formula (1) is more preferably 3 or less, and further preferably 2 or less.

Both of such accuracy error that satisfies Formula (1), i.e. high dimensional accuracy, and sufficient component strength have not been attainable by conventional steels, and are first attained by the disclosed steel composition.

The following describes the disclosed manufacturing method.

The disclosure is intended to enhance the helix accuracy of teeth and thus reduce noise and improve fatigue strength. The reduction in area during tooth forming is important for this purpose. In detail, it is important that the reduction in area is in the range of Formula (2):

$$19\% \leq \{(A - \pi \times (d/2)^2)/A\} \times 100 \leq 70\% \quad (2)$$

where A is the sectional area before tooth forming (mm$^2$), and d is the pitch diameter of the toothed component (mm).

In the case where the reduction in area indicated in Formula (2) exceeds 70%, the critical formability of the steel is exceeded, and cracking occurs during forging. The reduction in area during tooth forming is therefore 70% or less. The reduction in area during tooth forming is preferably 60% or less. Meanwhile, to achieve higher fatigue strength by the formation of fiber flow which is one of the useful effects of cold forging, the reduction in area during tooth forming needs to be 19% or more. The reduction in area during tooth forming is preferably 25% or more.

Note that the cold forging conditions are not particularly limited, and conventionally known conditions may be used.

After the aforementioned cold forging, carburizing treatment is performed to obtain the product. In some cases, however, fatigue strength degraded after the carburizing treatment.

We repeatedly studied this matter, and as a result discovered that, in the instances where the degradation in fatigue strength was seen, the crystal grains coarsened after the carburizing treatment.

We then made research on the cause of this phenomenon, and found out that the crystal grain coarsening strongly correlates with the number of times annealing is performed in the cold forging.

In detail, in the case where annealing is performed before or at a midpoint of the cold forging, while the steel structure before annealing is a structure of ferrite and pearlite deformed by work, the steel structure after annealing is a structure in which a spheroidal carbide is dispersed in a recrystallized ferrite matrix phase. Recrystallized ferrite is very fine, and the nucleation site of reverse-transformed austenite during carburizing heating increases, so that austenite in the initial stage of carburizing is refined. Extremely refined austenite is susceptible to abnormal grain growth. We discovered that this is the reason why the crystal grains tend to coarsen as a result of annealing. We also found out that annealing causes the precipitate to coarsen. Basically, if the precipitate is fine, the abnormal grain growth of austenite can be suppressed. In the case where the precipitate coarsens as a result of annealing, however, the pinning force of the grain boundaries is lost, making it difficult to suppress the abnormal grain growth of austenite. Such phenomenon becomes more noticeable as annealing is repeated. We discovered that, when the number of times annealing is performed is 3 or more, the crystal grains coarsen and the fatigue strength degrades.

Our research has revealed the following. Favorable fatigue strength is achieved if, in prior austenite grains after the carburizing treatment, the area ratio of the crystal grains of 50 μm or less is 80% or more and the area ratio of the crystal grains exceeding 300 μm is 10% or less. If annealing is performed 3 or more times in the cold forging, however, the crystal grains coarsen and the aforementioned fine grain structure is unlikely to be obtained.

Hence, to achieve not only lower noise but also higher fatigue strength, it is preferable that the number of times annealing is performed before tooth forming is 2 or less and, in prior austenite grains after the carburizing treatment, the area ratio of the crystal grains of 50 μm or less is 80% or more and the area ratio of the crystal grains exceeding 300 μm is 10% or less.

Note that the annealing conditions in the cold forging are not particularly limited, and conventionally known conditions may be used. The annealing temperature is preferably about 760° C. to 780° C. Moreover, the carburizing treatment conditions are not particularly limited, and conventionally known conditions may be used. In typical treatment, the steel material is carburized at 900° C. to 960° C. in a carburizing gas atmosphere and then quenched, and further tempered at 120° C. to 250° C.

Crystal grain coarsening during carburizing can also be suppressed by fine particle distribution of Al nitride or Nb carbonitride. However, when annealing is performed a plurality of times, Al nitride or Nb carbonitride coarsens, and as a result loses the crystal grain coarsening suppressibility during carburizing. It is therefore preferable to limit the number of times annealing is performed to 2 or less. The number of times annealing is performed is more preferably 1 or less.

EXAMPLES

The structures and function effects according to the disclosure are described in more detail below, by way of examples. Note that the disclosed component and method are not limited to the following examples, and modifications can be made as appropriate within the range in which the subject matter of the disclosure is applicable, with such modifications being also included in the technical scope of the disclosure.

Example 1

Steels having the respective chemical compositions shown in Table 1 were each obtained by steelmaking, and formed into a round bar with a diameter of 39.5 mm to 90 mm by hot rolling. The obtained round bar as a material was cold-forged into the involute gear shape shown in Table 2, and then was subject to carburizing heat treatment under the conditions illustrated in FIG. 1. In Table 1, each steel whose Ti content is 0.001% or 0.002% is steel in which Ti is not added actively but mixed as an impurity.

Respective gears after the carburizing heat treatment were prepared for the prior austenite grain size measurement and for the helix accuracy measurement and fatigue test. The prior austenite grain size and the helix accuracy were measured, and further the fatigue test was conducted.

The results are shown in Table 3.

The prior austenite grain size and the area ratio of crystal grains after the carburizing heat treatment were measured as follows. Ten fields of each of the 0.3 mm inside, 0.5 mm inside, 0.7 mm inside, and 1.0 mm inside positions immediately below the pitch circle of the teeth were photographed by an optical microscope with 400 magnification and, for 40 fields in total, the area ratio of the crystal grains of 50 μm or less and the area ratio of the crystal grains exceeding 300 μm were quantified using image analysis software (Image-Pro # PLUS manufactured by Media Cybernetics, Inc.).

The helix accuracy was measured as follows. The total helix deviation was measured from both sides of all teeth by a three-dimensional shape measurement instrument in compliance with JIS B 1702-1, and the left side of Formula (1) was calculated from the maximum total helix deviation $B_{max}$ and the face width L.

The gear fatigue test was conducted as follows. The gear was tested at 1800 rpm using a power circulation type gear fatigue tester to determine the fatigue limit strength (load torque) for $10^7$ times, and the noise in this strength was measured by a noise meter. This test is based on the assumption that fatigue strength of 200 N·m or more is sufficient and noise of 80 dB or less is favorable.

TABLE 1

| Steel symbol | Chemical composition (mass %) | | | | | | | | | | | | | Remarks |
|---|---|---|---|---|---|---|---|---|---|---|---|---|---|---|
| | C | Si | Mn | P | S | Al | N | Cr | B | Nb | Ti | Sn | Sb | |
| A | 0.11 | 0.05 | 0.53 | 0.013 | 0.012 | 0.03 | 0.0051 | 1.56 | 0.0022 | 0.031 | 0.001 | — | — | Conforming steel |
| B | 0.16 | 0.05 | 0.58 | 0.013 | 0.012 | 0.03 | 0.0062 | 1.4 | 0.0019 | 0.028 | 0.001 | — | — | Conforming steel |
| C | 0.18 | 0.05 | 0.44 | 0.013 | 0.012 | 0.02 | 0.0061 | 1.7 | 0.0011 | 0.032 | 0.001 | — | — | Conforming steel |
| D | 0.19 | 0.04 | 0.41 | 0.013 | 0.012 | 0.03 | 0.0064 | 1.2 | 0.0006 | 0.029 | 0.001 | — | — | Conforming steel |
| E | 0.21 | 0.09 | 0.36 | 0.013 | 0.012 | 0.04 | 0.0048 | 2.5 | 0.0015 | 0.049 | 0.001 | — | 0.01 | Conforming steel |
| F | 0.22 | 0.03 | 0.74 | 0.013 | 0.012 | 0.02 | 0.0029 | 0.5 | 0.0018 | 0.011 | 0.001 | 0.01 | — | Conforming steel |
| G | 0.28 | 0.13 | 0.51 | 0.013 | 0.012 | 0.01 | 0.0068 | 1.2 | 0.0019 | 0.033 | 0.001 | — | — | Conforming steel |
| H | 0.34 | 0.11 | 0.43 | 0.013 | 0.012 | 0.03 | 0.0079 | 2.8 | 0.0016 | 0.079 | 0.001 | — | — | Conforming steel |
| I | 0.25 | <u>0.15</u> | 0.62 | 0.012 | 0.012 | 0.03 | 0.0051 | 1.3 | 0.0020 | 0.03 | 0.002 | — | — | Comparative steel |
| J | 0.27 | 0.03 | <u>0.82</u> | 0.013 | 0.012 | 0.03 | 0.0045 | 1.2 | 0.0012 | 0.026 | 0.001 | — | — | Comparative steel |
| K | 0.20 | 0.05 | 0.49 | 0.012 | 0.013 | <u>0.05</u> | 0.0044 | 1.2 | 0.0016 | 0.043 | 0.001 | — | — | Comparative steel |
| L | 0.22 | 0.01 | 0.55 | 0.013 | 0.012 | 0.03 | <u>0.0082</u> | 1.5 | 0.0026 | 0.021 | 0.001 | — | — | Comparative steel |
| M | 0.28 | 0.11 | 0.71 | 0.012 | 0.012 | 0.03 | 0.0035 | <u>0.4</u> | 0.0016 | 0.026 | 0.001 | — | — | Comparative steel |
| N | 0.21 | 0.06 | 0.52 | 0.012 | 0.013 | 0.02 | 0.0054 | <u>3.1</u> | 0.0009 | 0.018 | 0.002 | — | — | Comparative steel |
| O | 0.13 | 0.05 | 0.66 | 0.012 | 0.012 | 0.03 | 0.0055 | 1.5 | <u>0.0004</u> | 0.025 | 0.001 | — | — | Comparative steel |
| P | 0.29 | 0.05 | 0.42 | 0.012 | 0.012 | 0.03 | 0.0029 | 1.6 | 0.0016 | 0.033 | <u>0.013</u> | — | — | Comparative steel |
| Q | 0.21 | <u>0.20</u> | <u>0.89</u> | 0.012 | 0.013 | 0.03 | 0.0125 | 1.1 | 0.0001 | 0.001 | 0.001 | — | — | Comparative steel |
| R | 0.18 | 0.05 | 0.41 | 0.012 | 0.013 | 0.03 | 0.0036 | 1.1 | 0.0021 | 0.001 | <u>0.025</u> | — | — | Comparative steel |

TABLE 2

| Involute gear specifications | |
|---|---|
| Large diameter (mm) | 38 |
| Small diameter (mm) | 33.5 |
| Module | 1 |
| Pressure angle (°) | 35 |
| Number of teeth | 36 |
| Reference pitch diameter (mm) | 36 |
| Base diameter (mm) | 29.4895 |
| Face width (mm) | 30 |

TABLE 3

| No. | Steel symbol | Annealing count (times) | Diameter before gear forging (mm) | Middle side of Formula (2) | Prior austenite grain Area ratio of crystal grains of 50 μm or less (%) | Prior austenite grain Area ratio of crystal grains exceeding 300 μm (%) | Left side of Formula (1) | Fatigue strength (N·m) | Noise (dB) | Remarks |
|---|---|---|---|---|---|---|---|---|---|---|
| 1 | A | 0 | 50 | 48.2 | 93 | 2 | 1.8 | 238 | 70 | Example |
| 2 | B | 0 | 50 | 48.2 | 94 | 1 | 1.6 | 254 | 68 | Example |
| 3 | C | 0 | 50 | 48.2 | 93 | 2 | 1.9 | 245 | 72 | Example |
| 4 | D | 0 | 55 | 57.2 | 92 | 3 | 2.3 | 225 | 72 | Example |
| 5 | E | 0 | 65 | 69.3 | 95 | 2 | 4.8 | 205 | 78 | Example |
| 6 | F | 0 | 55 | 57.2 | 87 | 10 | 1.9 | 235 | 68 | Example |
| 7 | G | 0 | 60 | 64.0 | 91 | 5 | 2.9 | 215 | 78 | Example |
| 8 | H | 0 | 45 | 36.0 | 95 | 4 | 2.5 | 224 | 72 | Example |
| 9 | A | 0 | 80 | 79.7 | 91 | 6 | 5.1 | 186 | 83 | Comparative Example |
| 10 | B | 0 | 39.5 | 16.9 | 81 | 15 | 3.5 | 174 | 77 | Comparative Example |
| 11 | C | 0 | 90 | 84.0 | 88 | 9 | 5.3 | 184 | 85 | Comparative Example |
| 12 | I | 0 | 55 | 57.2 | 85 | 10 | 5.6 | 190 | 84 | Comparative Example |
| 13 | J | 0 | 45 | 36.0 | 87 | 8 | 5.1 | 176 | 87 | Comparative Example |
| 14 | K | 0 | 40 | 19.0 | 91 | 6 | 5.3 | 188 | 84 | Comparative Example |
| 15 | L | 0 | 55 | 57.2 | 89 | 8 | 5.2 | 184 | 82 | Comparative Example |
| 16 | M | 0 | 60 | 64.0 | 90 | 6 | 1.9 | 166 | 78 | Comparative Example |
| 17 | N | 0 | 65 | 69.3 | 92 | 4 | 5.3 | 197 | 83 | Comparative Example |
| 18 | O | 0 | 45 | 36.0 | 88 | 7 | 1.8 | 192 | 74 | Comparative Example |
| 19 | P | 0 | 60 | 64.0 | 71 | 19 | 5.6 | 179 | 81 | Comparative Example |
| 20 | Q | 0 | 55 | 57.2 | 77 | 15 | 5.1 | 178 | 84 | Comparative Example |
| 21 | R | 0 | 55 | 57.2 | 68 | 21 | 5.9 | 182 | 88 | Comparative Example |

As shown in Table 3, in the case where the left side of Formula (1) indicating the helix accuracy was 5 or less, the noise was reduced to 80 dB or less. Moreover, in the case where the steels having the chemical compositions satisfying the disclosed range were used and the value in Formula (2) was in the range of 19% to 70%, the prior austenite grain size satisfied the aforementioned conditions and high fatigue strength of 200 N·m or more was achieved.

Example 2

Figure 2:
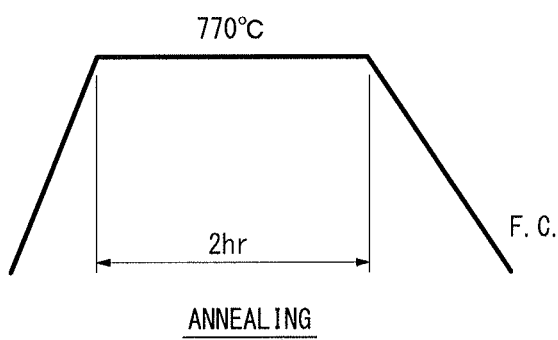
FIG. 2 is a diagram illustrating annealing conditions.

Steels A, B, C, Q, and R used in Example 1 were each formed into a round bar of 50 mm in diameter by hot rolling. The obtained round bar was annealed under the conditions illustrated in FIG. 2, cold-forged into the involute gear shape shown in Table 2, and then was subject to carburizing heat treatment under the conditions illustrated in FIG. 1.

After the carburizing heat treatment, the prior austenite grain size and the helix accuracy were measured, and then the fatigue test was conducted.

The results are shown in Table 4.

The reduction in area during the cold forging and the prior austenite grain size measurement, helix accuracy measurement, and fatigue test after the carburizing heat treatment were the same as the methods in Example 1.

TABLE 4

| No. | Steel symbol | Annealing count (times) | Diameter before gear forging (mm) | Middle side of Formula (2) | Prior austenite grain Area ratio of crystal grains of 50 μm or less (%) | Prior austenite grain Arear ratio of crystal grains exceeding 300 μm (%) | Left side of Formula (1) | Fatigue strength (N·m) | Noise (dB) | Remarks |
|---|---|---|---|---|---|---|---|---|---|---|
| 23 | A | 1 | 50 | 48.2 | 92 | 3 | 1.7 | 225 | 74 | Example |
| 24 | B | 1 | 50 | 48.2 | 93 | 3 | 1.5 | 249 | 70 | Example |
| 25 | C | 1 | 50 | 48.2 | 91 | 2 | 1.8 | 251 | 69 | Example |
| 26 | Q | 1 | 50 | 48.2 | 75 | 21 | 5.1 | 186 | 81 | Comparative Example |
| 27 | R | 1 | 50 | 48.2 | 67 | 18 | 5.5 | 187 | 84 | Comparative Example |

As shown in Table 4, with steels A, B, and C having the chemical compositions satisfying the disclosed range, high fatigue strength of 200 N·m or more was achieved by setting the number of annealing operations to 1 and controlling the value in Formula (2) to be in the range of 19% to 70%. On the other hand, with steels Q and R having the chemical compositions not satisfying the disclosed range, desired fine grains were not obtained and so favorable fatigue strength was not achieved even by setting the number of annealing operations to 1 and controlling the value in Formula (2) to be in the range of 19% to 70%.

Example 3

Steels A, B, C, Q, and R used in Example 1 were each formed into a round bar of 45 mm in diameter by hot rolling. The obtained round bar was annealed under the conditions illustrated in FIG. 2, and cold-forged into a round bar of 50 mm in diameter. Subsequently, the round bar was annealed again under the conditions illustrated in FIG. 2, cold-forged into the involute gear shape shown in Table 2, and then was subject to carburizing heat treatment under the conditions illustrated in FIG. 1.

After the carburizing heat treatment, the prior austenite grain size and the helix accuracy were measured, and then the fatigue test was conducted.

The results are shown in Table 5.

The reduction in area during the cold forging and the prior austenite grain size measurement, helix accuracy measurement, and fatigue test after the carburizing heat treatment were the same as the methods in Example 1.

TABLE 5

| No. | Steel symbol | Annealing count (times) | Diameter before gear forging (mm) | Middle side of Formula (2) | Prior austenite grain Area ratio of crystal grains of 50 μm or less (%) | Prior austenite grain Arear ratio of crystal grains exceeding 300 μm (%) | Left side of Formula (1) | Fatigue strength (N·m) | Noise (dB) | Remarks |
|---|---|---|---|---|---|---|---|---|---|---|
| 28 | A | 2 | 50 | 48.2 | 90 | 4 | 1.7 | 221 | 70 | Example |
| 29 | B | 2 | 50 | 48.2 | 92 | 4 | 1.7 | 254 | 73 | Example |
| 30 | C | 2 | 50 | 48.2 | 90 | 4 | 1.6 | 235 | 75 | Example |
| 31 | Q | 2 | 50 | 48.2 | 76 | 19 | 5.1 | 186 | 85 | Comparative Example |
| 32 | R | 2 | 50 | 48.2 | 71 | 20 | 5.5 | 187 | 86 | Comparative Example |

As in Example 2, as shown in Table 5, with steels A, B, and C according to the disclosed examples, high fatigue strength of 200 N·m or more was achieved by setting the number of annealing operations to 2 and controlling the value in Formula (2) to be in the range of 19% to 70%. On the other hand, with steels Q and R according to the comparative examples, desired fine grains were not obtained and so favorable fatigue strength was not achieved even by setting the number of annealing operations to 2 and controlling the value in Formula (2) to be in the range of 19% to 70%.

Example 4

Steels A, B, C, Q, and R used in Example 1 were each formed into a round bar of 40 mm in diameter by hot rolling. The obtained round bar was annealed under the conditions illustrated in FIG. 2, and cold-forged into a round bar of 45 mm in diameter. Subsequently, the round bar was annealed again under the conditions illustrated in FIG. 2, and cold-forged into a round bar of 50 mm in diameter. Subsequently, the round bar was annealed again under the conditions illustrated in FIG. 2, cold-forged into the involute gear shape shown in Table 2, and then was subject to carburizing heat treatment under the conditions illustrated in FIG. 1.

After the carburizing heat treatment, the prior austenite grain size and the helix accuracy were measured, and then the fatigue test was conducted.

The results are shown in Table 6.

The reduction in area during the cold forging and the prior austenite grain size measurement, helix accuracy measurement, and fatigue test after the carburizing heat treatment were the same as the methods in Example 1.

TABLE 6

| No. | Steel symbol | Annealing count (times) | Diameter before gear forging (mm) | Middle side of Formula (2) | Prior austenite grain Area ratio of crystal grains of 50 μm or less (%) | Arear ratio of crystal grains exceeding 300 μm (%) | Left side of Formula (1) | Fatigue strength (N · m) | Noise (dB) | Remarks |
|---|---|---|---|---|---|---|---|---|---|---|
| 33 | A | 3 | 50 | 48.2 | 80 | 13 | 3.6 | 183 | 76 | Comparative Example |
| 34 | B | 3 | 50 | 48.2 | 81 | 12 | 2.8 | 174 | 79 | Comparative Example |
| 35 | C | 3 | 50 | 48.2 | 78 | 10 | 1.9 | 194 | 71 | Comparative Example |
| 36 | Q | 3 | 50 | 48.2 | 74 | 23 | 5.9 | 178 | 83 | Comparative Example |
| 37 | R | 3 | 50 | 48.2 | 69 | 25 | 6.1 | 182 | 89 | Comparative Example |

As shown in Table 6, in the case where annealing was performed 3 times before tooth forming, favorable fatigue characteristics were not obtained regardless of the chemical composition.

The invention claimed is:

1. A mechanical structural component that is a toothed component obtained by performing cold forging and carburizing treatment on a steel having a chemical composition that consists of, in % by mass:
   0.10% to 0.35% C;
   0.01% to 0.13% Si;
   0.30% to 0.80% Mn;
   0.03% or less P;
   0.03% or less S;
   0.01% to 0.045% Al;
   0.5% to 3.0% Cr;
   0.0005% to 0.0040% B;
   0.003% to 0.080% Nb; and
   0.0080% or less N, and
   optionally one or two components selected from the group consisting of: 0.0003% to 0.50% Sb and 0.0003% to 0.50% Sn;
   wherein Ti mixed in the chemical composition as an impurity is limited to 0.005% or less, and the chemical composition has a balance being Fe and incidental impurities,
   in prior austenite grains of the toothed component obtained by performing cold forging and carburizing treatment, an area ratio of crystal grains having a diameter of 50 μm or less is 80% or more, and an area ratio of crystal grains having a diameter exceeding 300 μm is 10% or less, and
   a total helix deviation as prescribed by Japanese Industrial Standard (JIS) B 1702-1 of teeth of the toothed component obtained by performing the cold forging and carburizing treatment satisfies Formula (1)

$$(B_{max}/L) \times 10^3 \leq 5 \qquad (1)$$

where $B_{max}$ is a maximum total helix deviation in all teeth in mm, and L is a face width in mm.

* * * * *